United States Patent
Wang et al.

(10) Patent No.: US 9,301,233 B2
(45) Date of Patent: Mar. 29, 2016

(54) METHODS AND APPARATUS FOR ENHANCED CELL DETECTION

(71) Applicant: QUALCOMM Incorporated, San Diego, CA (US)

(72) Inventors: Fan Wang, Sunnyvale, CA (US); Preyas Devangbhai Desai, San Diego, CA (US); Sundaresan Tambaram Kailasam, San Diego, CA (US); Vikas Gulati, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 13/891,687

(22) Filed: May 10, 2013

(65) Prior Publication Data
US 2014/0335862 A1 Nov. 13, 2014

(51) Int. Cl.
*H04W 36/24* (2009.01)
*H04W 36/14* (2009.01)
*H04W 36/36* (2009.01)

(52) U.S. Cl.
CPC .............. *H04W 36/24* (2013.01); *H04W 36/14* (2013.01); *H04W 36/36* (2013.01)

(58) Field of Classification Search
CPC ...... H04W 36/24; H04W 36/14; H04W 36/36
USPC .................. 455/434, 436–437, 435.2–435.3; 370/252
See application file for complete search history.

(56) References Cited

U.S. PATENT DOCUMENTS

| | | | |
|---|---|---|---|
| 8,532,652 B1 * | 9/2013 | Edara | 455/434 |
| 2009/0238117 A1 * | 9/2009 | Somasundaram et al. | 370/328 |
| 2009/0239533 A1 * | 9/2009 | Somasundaram et al. | 455/434 |
| 2010/0029274 A1 * | 2/2010 | Deshpande et al. | 455/435.3 |
| 2010/0113020 A1 * | 5/2010 | Subramanian et al. | 455/435.2 |
| 2010/0203892 A1 * | 8/2010 | Nagaraja et al. | 455/437 |
| 2010/0248722 A1 * | 9/2010 | Van Bussel et al. | 455/436 |
| 2011/0045830 A1 * | 2/2011 | Wu | 455/435.2 |
| 2011/0170481 A1 * | 7/2011 | Gomes et al. | 370/328 |
| 2011/0244870 A1 * | 10/2011 | Lee | 455/444 |
| 2012/0014267 A1 * | 1/2012 | Gomes et al. | 370/252 |
| 2012/0099466 A1 * | 4/2012 | Aoyama et al. | 370/252 |
| 2012/0113859 A1 * | 5/2012 | Jung et al. | 370/252 |
| 2012/0244867 A1 * | 9/2012 | Takaki | 455/437 |

(Continued)

FOREIGN PATENT DOCUMENTS

EP  2 557 842 A1  2/2013

OTHER PUBLICATIONS

International Search Report and Written Opinion—PCT/US2014/036732—ISA/EPO—Oct. 17, 2014. (14 total pages).

(Continued)

*Primary Examiner* — Nathan Taylor
(74) *Attorney, Agent, or Firm* — Arent Fox LLP

(57) ABSTRACT

Methods and apparatus of cell detection include determining whether communication between a user equipment and a serving cell satisfies a serving cell unsuitability condition. The methods and apparatus further include performing one or more autonomous search procedures based on whether the serving cell unsuitability condition has been satisfied. Moreover, the methods and apparatus include conducting cell reselection based on one or more results from the one or more autonomous search procedures, wherein the one or more results indicate at least one suitable cell for reselection.

28 Claims, 9 Drawing Sheets

(56) References Cited

U.S. PATENT DOCUMENTS

2012/0263145 A1 10/2012 Marinier et al.
2013/0344873 A1* 12/2013 Sane et al. .................... 455/437
2014/0335862 A1* 11/2014 Wang et al. ................... 455/436
2014/0342741 A1* 11/2014 Li et al. ......................... 455/437

OTHER PUBLICATIONS

3GPP TS 25.133 V11.3.0 (Dec. 2012), "3rd Generation Partnership Project; Technical Specification Group Radio Access Network; Requirements for support of radio resource management (FDD)", Release 11, Version 11.3.0, Dec. 2012, 282 pages.

3GPP TS 25.304, V11.1.0 (Dec. 2012) "3rd Generation Partnership Project; Technical Specification Group Radio Access Network; User Equipment (UE) procedures in idle mode and procedures for cell reselection in connected mode", Release 11, Version 11.1.0, Dec. 2012, 53 Pages.

3GPP TSG-RAN WG2#67, "Radio Link Failure in CSG deployments", Motorola, R2-094652, Aug. 24-28, 2009, 2 Pages.

3rd Generation Partnership Project; Technical Specification Group GSM/EDGE Radio Access Network; Radio subsystem link control (Release 10), 3GPP Standard; 3GPP TS 45.008, 3rd Generation Partnership Project (3GPP), Mobile Competence Centre; 650, Route Des Lucioles; F-06921 Sophia-Antipolis Cedex; France, No. V10.0.0, Mar. 1, 2011, pp. 1-148, XP050476679, [retrieved on Apr. 1, 2011].

* cited by examiner

METHODS AND APPARATUS FOR ENHANCED CELL DETECTION

BACKGROUND

1. Field

Aspects of the present disclosure relate generally to wireless communication systems, and more particularly to enhanced closed subscriber group cell detection.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

To supplement conventional mobile phone network base stations, additional base stations may be deployed to provide more robust wireless coverage to mobile units. For example, wireless relay stations and small-coverage base stations (e.g., commonly referred to as access point base stations, Home NodeBs, femto access points, or femto cells) may be deployed for incremental capacity growth, richer user experience, and in-building coverage. Typically, such small-coverage base stations are connected to the Internet and the mobile operator's network via DSL router or cable modem. As these other types of base stations may be added to the conventional mobile phone network (e.g., the backhaul) in a different manner than conventional base stations (e.g., macro base stations), there is a need for effective techniques for managing these other types of base stations and their associated user equipment.

In some wireless communication systems, a user equipment (UE) selects and maintains a connection with a base station providing communication capabilities for the UE. Further, in such wireless communication systems, femto cells are deployed to improve wireless network communications when experiencing poor base station (e.g., Home Node B) connections. Such deployments typically occur indoors to help alleviate poor signal strength by facilitating mobile communication with the network via broadband. However, in some cases, UEs may not be configured to locate such femto cells or other similar sized cells. Thus, enhancements in cell detections and reselections are desired.

SUMMARY

In one aspect, a method of cell detection includes determining whether communication between a user equipment and a serving cell satisfies a serving cell unsuitability condition. The method further includes performing one or more autonomous search procedures based on whether the serving cell unsuitability condition has been satisfied. Moreover, the method includes conducting cell reselection based on one or more results from the one or more autonomous search procedures, wherein the one or more results indicate at least one suitable cell for reselection.

Another aspect of the disclosure provides an apparatus for cell detection includes means for determining whether communication between a user equipment (UE) and a serving cell satisfies a serving cell unsuitability condition. The apparatus further includes means for performing one or more autonomous search procedures based on whether the serving cell unsuitability condition has been satisfied. Moreover, the apparatus include means for conducting cell reselection based on one or more results from the one or more autonomous search procedures, wherein the one or more results indicate at least one suitable cell for reselection.

In another aspect, a computer program product for cell detection comprises a computer-readable medium. The computer-readable medium includes at least one instruction for determining whether communication between a user equipment (UE) and a serving cell satisfies a serving cell unsuitability condition. The computer-readable medium further includes at least one instruction for performing one or more autonomous search procedures based on whether the serving cell unsuitability condition has been satisfied. Moreover, the computer-readable medium includes at least one instruction for conducting cell reselection based on one or more results from the one or more autonomous search procedures, wherein the one or more results indicate at least one suitable cell for reselection.

Additional aspects provide an apparatus for cell detection including a serving cell unsuitability determiner configured to determine whether communication between a user equipment (UE) and a serving cell satisfies a serving cell unsuitability condition. The apparatus further includes an autonomous search procedure component configured to perform one or more autonomous search procedures based on whether the serving cell unsuitability condition has been satisfied. Moreover, the apparatus includes a reselection component configured to conduct cell reselection based on one or more results from the one or more autonomous search procedures, wherein the one or more results indicate at least one suitable cell for reselection.

These and other aspects of the invention will become more fully understood upon a review of the detailed description, which follows.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
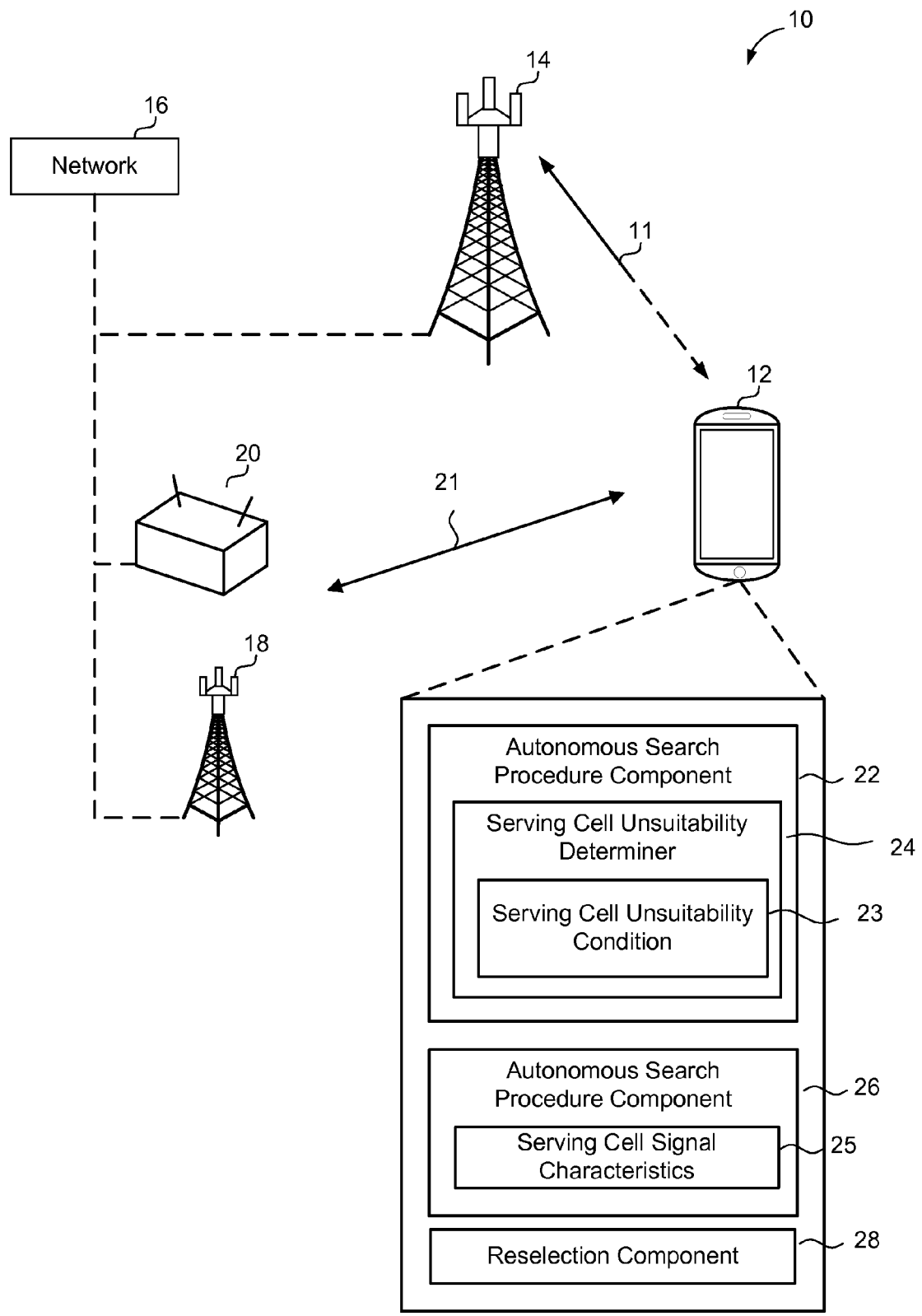
FIG. 1 is a schematic diagram of a communication network including an aspect of a user equipment that may perform autonomous search procedures.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, femto access point, and so on.

The present aspects generally relate to enhanced cell detection. For example, when a user equipment (UE) is switched on, a network (e.g., public land mobile network) is selected and the UE searches for a suitable cell of the network to camp on. For example, the UE may detect one or more suitable cells, and choose a selected cell to provide available services, correspondingly tuning to a control channel of the selected cell. This choosing and tuning may be known as "camping on the cell". When the UE is camped on the selected cell, it may in part maintain a serving cell connection and thus may be in a connected state. During the connected state, the UE may readily communicate with the network via the serving cell. However, in some cases, due to a plurality of factors that may affect the serving cell connection, the UE may experience or expect to experience poor serving cell communications. As such, to maintain an active connection with the network, the serving cell may no longer be considered "suitable" for the UE. Even so, one or more available cells may be in communication coverage of the UE. The UE may attempt to locate the one or more available cells to determine whether connection with such cells is suitable. However, current implementations may limit the capabilities for UEs to locate available suitable cells in communication coverage of the UE in this scenario. Accordingly, in some aspects, the present methods and apparatus may provide an efficient and effective solution, as compared to current solutions, to provide enhanced cell detection for UEs.

Referring to FIG. 1, in one aspect, a wireless communication system 10 includes UE 12 configured to perform one or more autonomous search procedures when a serving cell becomes unsuitable in order to avoid an out of service (OOS) condition. As used herein, the term "autonomous search procedure(s)" includes any cell search independent of any specification- or standard-dictated searches. In these aspects, UE 12 may be in communication coverage of at least one network entity, such as serving cell 14. Further, UE 12 may communicate with network 16 via serving cell 14, or other available network entities (e.g., macro cell 18 or femto cell 20). In some aspects, multiple UEs including UE 12 may be in communication coverage with one or more network entities including serving cell 14, macro cell 18 and femto cell 20. In an example, UE 12 may be camped on serving cell 14 and as such, may transmit and/or receive wireless communications from serving cell 14. Such wireless communications may include or otherwise indicate or enable UE 12 to determine serving cell signal characteristics 25. In a non-limiting case, UE 12 may have completed the cell selection/reselection process and has chosen a cell (e.g., serving cell 14) to camp on. UE 12 may then monitor system information and in some cases paging information and/or serving cell signal characteristics 25. Further, in other cases, UE 12 may be camped on any cell (e.g., serving cell 14, macro cell 18 and femto cell 20).

Moreover, for instance, femto cell 20 may be part of a closed subscriber group (CSG), and thus may be referred to as a CSG cell. For example, a CSG identifies subscribers of an operator who are permitted to access one or more cells of the PLMN, where the one or more cells have restricted access (e.g., CSG cells). It should be understood that CSG cells may be cells broadcasting at least CSG Indicator and/or a specific CSG identity. UE 12 may distinguish, differentiate and/or detect CSG cells by way of the CSG identity, which may be an identifier broadcast by a CSG or a hybrid cell (e.g., a cell that may operate in a restricted mode, e.g., as a CSG cell, or in a non-restricted mode) that is used by UE 12 to facilitate access for authorized members of the associated CSG.

In some aspects, UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Additionally, network entities such as serving cell 14, macro cell 18 and/or femto cell 20 may include or additionally be referred to as a picocell, a relay, a Node B, a mobile Node B, a UE (e.g., communicating in peer-to-peer or ad-hoc mode with UE 12), or substantially any type of component that can communicate with UE 12 to provide wireless network access (e.g., to network 16) at the UE 12.

According to the present aspects, UE 12 may include autonomous search procedure component 22, which may be configured to perform one or more autonomous search procedures based on whether a serving cell unsuitability condition has been satisfied. For example, when autonomous search procedure component 22 anticipates or experiences unsuitable communication conditions with serving cell 14, the autonomous search procedure component 22 may be configured to perform one or more autonomous search procedures to search for one or more suitable cells, which may include femto cell 20 and/or macro cell 18. Serving cell (e.g., serving cell 14) suitability may be determined via serving cell unsuitability determiner 24. That is, autonomous search procedure component 22 may include serving cell unsuitability determiner 24, which may be configured to determine whether communication between UE 12 and serving cell 14 satisfies a serving cell unsuitability condition 23.

Further, in one non-limiting example, upon determining that serving cell 14 is experiencing serving cell unsuitability condition 23, UE 12 may initiate the present autonomous search procedures prior to, or in conjunction with, a specification- or standard-dictated search referred to as a panic search. For example, refer to 3GPP Technical Specification 25.304, incorporated herein by reference. For instance, the panic search includes a search of intra-freq neighbors, inter-freq neighbors (e.g., included in neighbor cell list (NCL)), and/or inter-RAT cell or frequencies (e.g., specified in system information blocks (SIB)). It should be understood that a neighbor cell list may be a list of neighbor cells provided by the network (e.g., serving cell 14) to a UE (e.g., UE 12) to facilitate mobility. However, the panic search may be limited such that suitable cells (e.g., CSG cells) in the UEs coverage area may nonetheless go undetected due to, for example, an absence of a particular suitable cell or cells in the NCL, or the CSG frequency may not be indicated as available in broadcasted system information blocks (SIBs), which may be a part of wireless communications 11 from serving cell 14. Accordingly, the autonomous search procedures executed by autonomous search procedure component 22 may resolve such deficiencies by detecting the available suitable cells providing coverage for the UE 12. Further aspects regarding autonomous search procedure component 22 and serving cell unsuitability determiner 24 are described herein with respect to FIG. 2.

In additional aspects, UE 12 may include communication component 26, which may be configured to transmit and receive communications, such as wireless communications 11 with one or more network entities (e.g., serving cell 14, macro cell 18 or femto cell 20). For example, in an aspect, the communication component 26 may receive serving cell signal characteristics 25 from one or more network entities (e.g., serving cell 14, macro cell 18 or femto cell 20) currently acting as the serving cell. Additionally, communication component 26 may be configured to transmit and/or receive (e.g., listening for suitable cells) autonomous search procedure signals/communications 21 enabling UE 12 to detect available cells upon determining a potential or actual serving cell 14 communication failure (e.g., based on serving cell unsuitability condition 23), and possibly to reselect to one of the available cells. Further, communication component 26 may include, but is not limited to, one or more of a transmitter, a receiver, a transceiver, protocol stacks, transmit chain components, and receive chain components.

Moreover, in an aspect, UE 12 may include reselection component 28, which may be configured to conduct cell reselection based on one or more results of one or more autonomous search procedures, wherein the one or more results indicates or otherwise detects at least one suitable cell for reselection. For instance, reselection component 24 may obtain or otherwise receive an indication of one or more suitable cells so as to reselect to a cell (e.g., in this case, macro cell 18 or femto cell 20) based on the indication. Further, in some aspects, rather than being separate components, it should be noted that reselection component 28 may include autonomous search procedure component 22, or vice versa.

Figure 2:
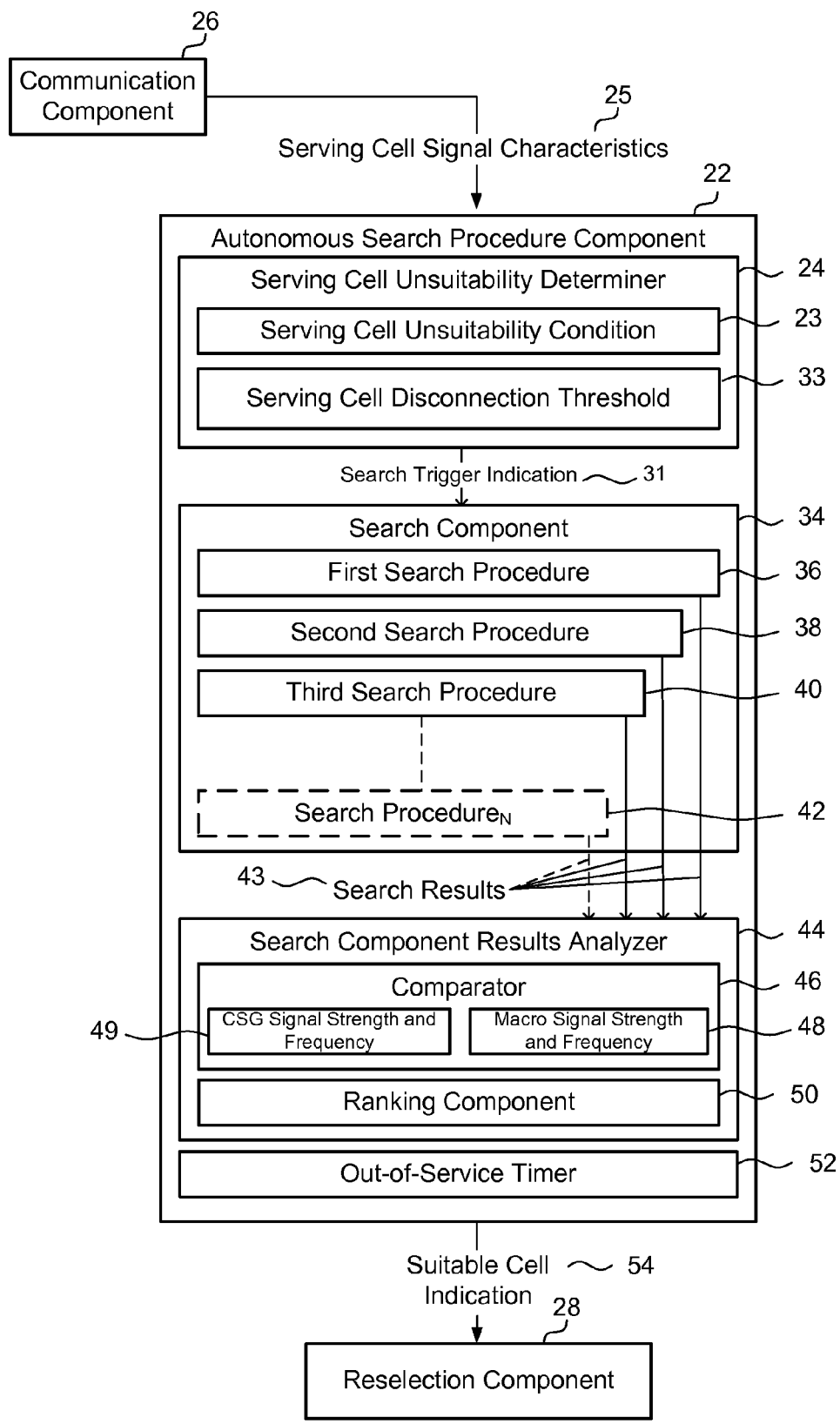
FIG. 2 is a schematic diagram of an aspect of the autonomous search procedure component of FIG. 1.

Referring to FIG. 2, in an aspect, autonomous search procedure component 22 may include various components and/or subcomponents, which may be configured to perform one or more autonomous search procedures based on whether a serving cell unsuitability condition has been satisfied. For example, autonomous search procedure component 22 may evaluate the suitability of a current serving cell and initiate an autonomous cell search to detect and, possibly, reselect to another suitable cell prior to the UE experiencing an OOS condition.

For example, in an aspect, autonomous search procedure component 22 may include serving cell unsuitability determiner 24, which may be configured to determine whether communication between a UE (e.g., UE 12) and a serving cell (e.g., serving cell 14) satisfies a serving cell unsuitability condition (e.g., serving cell unsuitability condition 23). For example, serving cell unsuitability determiner 24 may receive or otherwise obtain serving cell signal characteristics 25 to determine whether communication between UE 12 and serving cell 14 satisfies a serving cell unsuitability condition 23.

Further, serving cell unsuitability condition 23 may include a serving cell disconnection threshold value 33. The serving cell disconnection threshold value 33 may be a value indicative of potential or actual unsuitable wireless communication (e.g., between UE 12 and serving cell 14). For example, serving cell disconnection threshold value 33 may indicate an unsuitable communication condition based on or representative of one or more of received signal code power (RSCP), reference signal received power (RSRP), reference signal received quality (RSRQ), signal-to-noise ratio (SNR) and receive signal strength indicator (RSSI). Moreover, serving cell unsuitability determiner 24 may compare serving cell disconnection threshold value 33 to serving cell signal characteristics 25 so as to provide a search trigger indication 31 to search component 34 to perform one or more autonomous search procedures. For example, if the serving cell signal characteristics 25 are lower than or equal to the serving cell disconnection threshold 33, then serving cell unsuitability determiner 24 may provide indication to or trigger search component 34 to perform one or more autonomous search procedures. Hence, when the aforementioned comparison results in a triggering of the search component 34 (e.g., via search trigger indication 31), the serving cell unsuitability condition 23 may be considered satisfied. It should be understood that further aspects of the serving cell unsuitability condition 23 may be the same as or similar to the suitability criteria provided in 3GPP 25.304, aspects of which are incorporated herein. Further, it should be noted that an equivalent of serving cell signal characteristics 25 satisfying serving cell unsuitability condition 23 is serving cell signal characteristics 25 failing to satisfy a serving cell suitability condition, which is a condition where serving cell signal characteristics 25 are sufficient enough to justify maintaining a current serving cell.

In additional aspects, autonomous search procedure component 22 may include search component 34, which may be configured to perform one or more autonomous search procedures based on whether the serving cell unsuitability condition 23 has been satisfied. For example, search component 34 may receive search trigger indication 31 from serving cell unsuitability determiner 24, triggering search component 34 to perform one or more autonomous search procedures. Further, upon receiving search trigger indication 31, search component 34 may determine which search procedures or procedures are to be performed. For instance, search component 34 may analyze or otherwise process the search trigger indication 31 to determine the serving cell unsuitability level. In other words, search component 34 may autonomously and/or automatically determine which search procedure(s) to perform based on the search trigger indication 31. In other aspects, search trigger indication 31 may provide indication to search component 34 of the one or more specific search procedures to perform (e.g., first search procedure 36 and third search procedure 40).

Moreover, search component 34 may be configured such that one or more search procedures are performed based on priority values assigned to or determined for each search procedures. For example, first search procedure 36 may be prioritized over the second search procedure 38. In another instance, second search procedure 38 may be prioritized over the third search procedure 40. Prioritization of search procedures may be operator configurable or network configurable. Further, in some aspects, prioritization values may be included or otherwise embedded in search trigger indication 31. In some aspects, prioritization may be based on speed and/or likelihood of reselection success and/or relationship to a current serving cell (e.g., serving cell 14) of performing a given search procedure. As such, search component 34 may be configured to perform one or more search procedures based on one or more of search priorities and/or search trigger indication 31 determinations.

In one aspect, search component 34 may include first search procedure 36, which may be configured to search for previously camped frequencies. For example, first search procedure 36 may be configured to locally search for previously camped cells across one or more frequencies. Further, first search procedure 36 may indicate or otherwise configure search component 34 to search in a storage device on UE 12 (e.g., a cache) for previously camped cells across one or more cell frequencies. Such first search procedure 36 may locate one or more suitable cells (e.g., macro cell 18 and/or femto cell 20) relatively quickly as the search procedure searches for previously camped cells in local storage (e.g., cache). In one non-limiting example, UE 12 may have been previously camped on macro cell 18 (FIG. 1) prior to camping on serving cell 14. As macro cell 18 remains in communication coverage of UE 12, the first search procedure 36 may result in indication of macro cell 18 as a previously camped cell and/or frequency and hence suitable for reselection. Furthermore, first search procedure 36 may, in some cases, may be prioritized over other search procedures and/or be selected as the primary search procedure to be performed based on the search trigger indication 31.

Another aspect of search component 34 may include second search procedure 38, which may be configured to search a fingerprint database for fingerprint cells. For instance, second search procedure 38 may be configured to search for cell fingerprints corresponding to CSG cells (e.g., femto cell 20) associated with serving cell 14. In some aspects, the cell fingerprints may be a set of information that can be used to quickly identify one or more given cells. In other words, one or more CSG cells, one of which may be femto cell 20, may be associated with serving cell 14. Such association may provide UE 12 with alternate or additional serving cell options in the event of serving cell (e.g., serving cell 14) unsuitability. That is, in some cases, UE 12 may search for received signal characteristics that match or map to one or more characteristics of one or more cell fingerprints of one or more CSG cells associated with current serving cell 14. This allows UE 12 to obtain CSG cells (e.g., femto cell 20) associated with current serving cell 14. Furthermore, second search procedure 38 may, in some cases, be prioritized over other search procedures and/or be selected as the primary search procedure to be performed based on the search trigger indication 31.

A further aspect of search component 34 may include third search procedure 40, which may be configured to search for available cells in all detected frequencies. For instance, upon initiation of third search procedure 40, one or more components and/or subcomponents of UE 12 may search for or otherwise obtain available cells in all detected frequencies. Third search procedure 40 may perform, at least in part, an enhanced public land mobile network search (PLMN). In such a case, UE 12 may perform a designated PLMN search across one or more PLMNs associated with the serving cell. Furthermore, third search procedure 40 may, in some cases, be prioritized over other search procedures and/or be selected as the primary search procedure to be performed based on the search trigger indication 31. Further aspects of search component 34 may include an additional number, N, of search procedures, e.g., up to Search Procedure$_N$ 42, configured to search for one or more suitable cells.

Further aspects of autonomous search procedure component 22 may include search results analyzer 44, which may be configured to analyze or otherwise provide determinations based on the communicated search results 43 of the executed one or more autonomous search procedures. In some aspects, search results 43 may identify one or more suitable cells detected during the respective autonomous search procedure, and the one or more suitable cells may be macro cells or femto cells, including CSG cells or hybrid cell, or any combination thereof. Search results analyzer 44 may receive at least one search procedure result (e.g., first search procedure 36) for subsequent analysis and/or for making determinations. Such analysis and/or determinations may include, but are not limited to, suitable cell ranking (e.g., via ranking component 50). For instance, in one aspect, search results analyzer 44 may determine whether one or more search procedure results include at least one suitable macro cell. In other words, search results analyzer 44 may analyze the received search procedure results to determine whether one or more suitable macro cells (e.g., macro cell 18) is included in the results.

In further aspects, autonomous search procedure component 22 may include out-of-service timer 52, which may be configured to initiate upon a determination of serving cell unsuitability condition 23. For instance, out-of-service timer 52 may be configured to provide indication of a time duration in which autonomous search procedure may perform one or more search procedures and locate one or more suitable cells for reselection prior to an out-of-service state. Hence, one or more autonomous search procedures may commence and/or provide suitable cell indication 54 prior to an expiration of out-of-service timer 52.

Autonomous search procedure component 22, in an aspect, may communicate suitable cell indication 54 providing at least an indication of one or more suitable cells to the reselection component 28 for reselection. For instance, upon completion of one or more autonomous search procedures (e.g., first search procedure 36 and second search procedure 38) and subsequent search results analyzing by search results analyzer 44, autonomous search procedure component 22 may provide suitable cell indication 54 to reselection component 28 for initiating reselection to at least one suitable cell. For example, suitable cell indication 54 may include an indication that identifies one or more suitable cells (e.g., macro cell 18 and/or femto cell 20). For instance, in an aspect, when at least one suitable macro cell has not been detected by the one or more search procedures, but one or more CSG cells have been detected, then search results analyzer 44 may provide suitable cells indication 54 to reselection component 28 to conduct cell reselection to one of the one or more CSG cells (e.g., femto cell 20).

Additionally, in an aspect, search results analyzer 44 may further include comparator 46, which may be configured to determine whether a signal strength and/or frequency 49 of one or more CSG cells is greater than or equal to a signal strength and/or frequency 48 of at least one suitable macro cell when one or more suitable macro cells are detected. When comparator 46 determines that the CSG cell signal strength and/or frequency 49 is greater than or equal to the signal strength and/or frequency 48 of the at least one suitable macro cell, search results analyzer 44 may provide an indication (e.g., via suitable cells indication 54) to reselection component 28 to reselect to the CSG cell (e.g., femto cell 20). However, in some aspects, when the CSG cell signal strength and/or frequency 49 is not greater than or equal to the signal strength and/or frequency 48 of the at least one suitable macro cell, ranking component 50 may be configured to rank each detected cell. For instance, ranking component 50 may be configured to rank each detected suitable cell based on one or more of received energy-to-interference ratio (Ec/Io) and received signal code power (RSCP), e.g., from highest to lowest, wherein a higher value has priority over a lower value.

Figure 3:
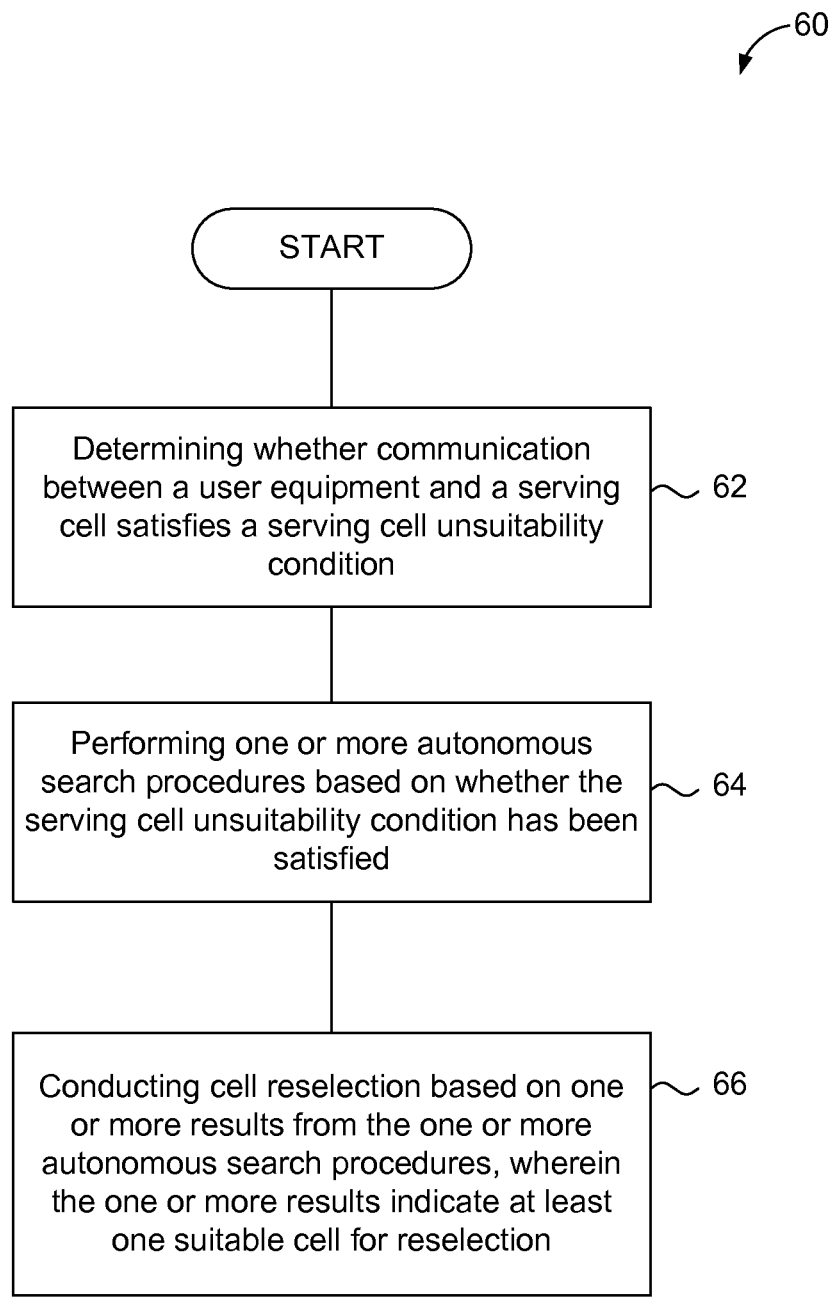
FIG. 3 is a flowchart of an aspect of a method of cell detection at a user equipment, e.g., according to FIG. 1.

Referring to FIG. 3, in operation, a UE such as UE 12 (FIG. 1) may perform one aspect of a method 60 for performing one or more autonomous search procedures. While, for purposes of simplicity of explanation, the methods herein are shown and described as a series of acts, it is to be understood and appreciated that the methods are not limited by the order of acts, as some acts may, in accordance with one or more aspects, occur in different orders and/or concurrently with other acts from that shown and described herein. For example, it is to be appreciated that the methods could alternatively be represented as a series of interrelated states or events, such as in a state diagram. Moreover, not all illustrated acts may be required to implement a method in accordance with one or more features described herein.

In an aspect, at block 62, method 60 may include determining whether communication between a UE and a serving cell satisfies a serving cell unsuitability condition. For example, as described herein, autonomous search procedure component 22 (FIGS. 1 and 2) may execute serving cell unsuitability determiner 24 to determine whether communication between a UE (e.g., UE 12) and a serving cell (e.g., serving cell 14) satisfies a serving cell unsuitability condition (e.g., 32).

In a further aspect, at block 64, method 60 may include performing one or more autonomous search procedures based on whether the serving cell unsuitability condition has been satisfied. For instance, as described herein, autonomous search procedure component 22 (FIGS. 1 and 2) may execute search component 34 to perform one or more autonomous search procedures based on whether the serving cell unsuitability condition 23 has been satisfied.

Moreover, at block 66, method 60 may include conducting cell reselection based on one or more results from the one or more autonomous search procedures, wherein the one or more results indicate at least one suitable cell for reselection. For example, UE 12 may execute reselection component 28 (FIGS. 1 and 2) upon receiving at least a suitable cells indication 54 from autonomous search procedure component 22 for conducting cell reselection based on the results thereof.

Figure 4:
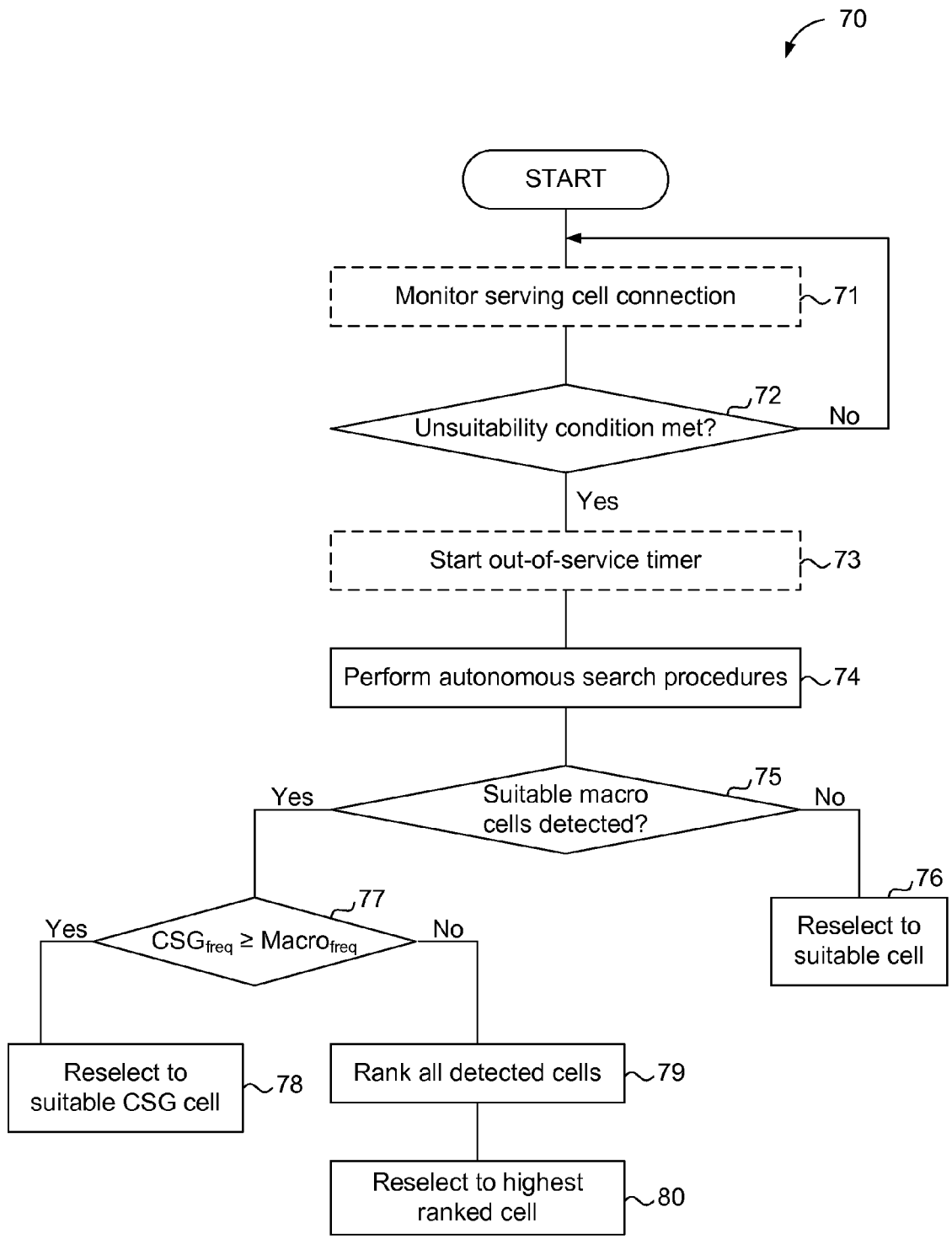
FIG. 4 is a flowchart of a further aspect of a method of cell detection at a user equipment, e.g., according to FIG. 1.

Referring to FIG. 4, in operation, a UE such as UE 12 may perform an aspect of method 70 for performing one or more autonomous search procedures and subsequent analysis of the search results. At block 71, method 70 may optionally monitor the serving cell connection. For example, as described herein, UE 12 may execute autonomous search procedure component 22 (FIGS. 1 and 2) to continuously monitor the serving cell 14 connection with UE 12. Monitoring of such connections between the UE 12 and serving cell 14 may result in monitoring and/or determination of serving cell signal characteristics 25 (FIGS. 1 and 2) indicative of the serving cell 14 connection quality and/or suitability.

At block 72, method 70 determines whether an unsuitability condition has been met. For example, as described herein, autonomous search procedure component 22 (FIGS. 1 and 2) may execute serving cell unsuitability determiner 24 to determine whether communication between a UE (e.g., UE 12) and a serving cell (e.g., serving cell 14) satisfies a serving cell unsuitability condition (e.g., 23). If the serving cell unsuitability condition 23 has not been met, method 70 may return to optional block 71. Otherwise, method 70 continues to optional block 73, where the out-of-service timer 73 is started upon an indication or determination that serving cell (e.g., serving cell 14) has become or may potentially become unsuitable for communication (e.g., based on the serving cell signal characteristics 25 falling below serving cell disconnection threshold 33). For example, as described herein, autonomous search procedure component 22 (FIGS. 1 and 2) may execute out-of-service timer 52 to initiate the timer.

Upon optional initiation of the out-of-service timer, method 70 may continue to block 74, where one or more autonomous search procedures are performed. For instance, as described herein, autonomous search procedure component 22 (FIGS. 1 and 2) may execute search component 34 to perform one or more autonomous search procedures based on the serving cell unsuitability condition 23. Further aspects of method 70 include block 75, where a determination is made of whether suitable macro cells are detected. For example, as described herein, autonomous search procedures component 22 (FIG. 2) may execute search results analyzer 44 to determine whether suitable macro cells (e.g., macro cell 18) are detected. If suitable macro cells are not detected, method 70 continues to block 76, where reselection is made to a suitable CSG cell. For instance, UE 12 may execute reselection component 28 (FIGS. 1 and 2) upon receiving at least a suitable cells indication 54 from autonomous search procedure component 22 for conducting cell reselection based on the results thereof.

However, when one or more suitable macro cells are detected, method 70 continues to block 77, where a determination is made whether a CSG cell signal strength and/or frequency is greater than or equal to the at least one suitable macro cell signal strength and/or frequency. For example, as described herein, search results analyzer 44 (FIGS. 1 and 2) may execute comparator 46 to determine whether a CSG cell signal strength and/or frequency 49 (e.g., femto cell 20) is greater than or equal to the at least one suitable macro cell signal strength and/or frequency 48 (e.g., macro cell 18). If the resulting comparison results in a positive affirmation, that is the CSG cell signal strength and/or frequency 49 is greater than or equal to a macro cell signal strength and/or frequency 48, method 70 may continue to block 78, where reselection is made to the suitable CSG cell. For instance, UE 12 may execute reselection component 28 (FIGS. 1 and 2) upon receiving at least a suitable cells indication 54 from autonomous search procedure component 22 for conducting cell reselection based on the results thereof.

However, if the resulting comparison results in a negative indication, that is the CSG cell signal strength and/or frequency 49 is less than the macro cell signal strength and/or frequency 48, method 70 may continue to block 79, where all the detected cells, including one or more suitable CSG cells and macro cells are ranked based on, for example, Ec/Io and/or RSCP. For instance, search results analyzer 44 (FIG. 2) may execute ranking component 50 to rank one or more detected suitable cells based on signal strength and/or frequency. At block 80, method 70 may reselect to the highest ranked cell. For example, UE 12 may execute reselection component 28 (FIGS. 1 and 2) upon receiving at least a suitable cells indication 54 from autonomous search procedure component 22 for conducting cell reselection based on the results thereof.

Figure 5:
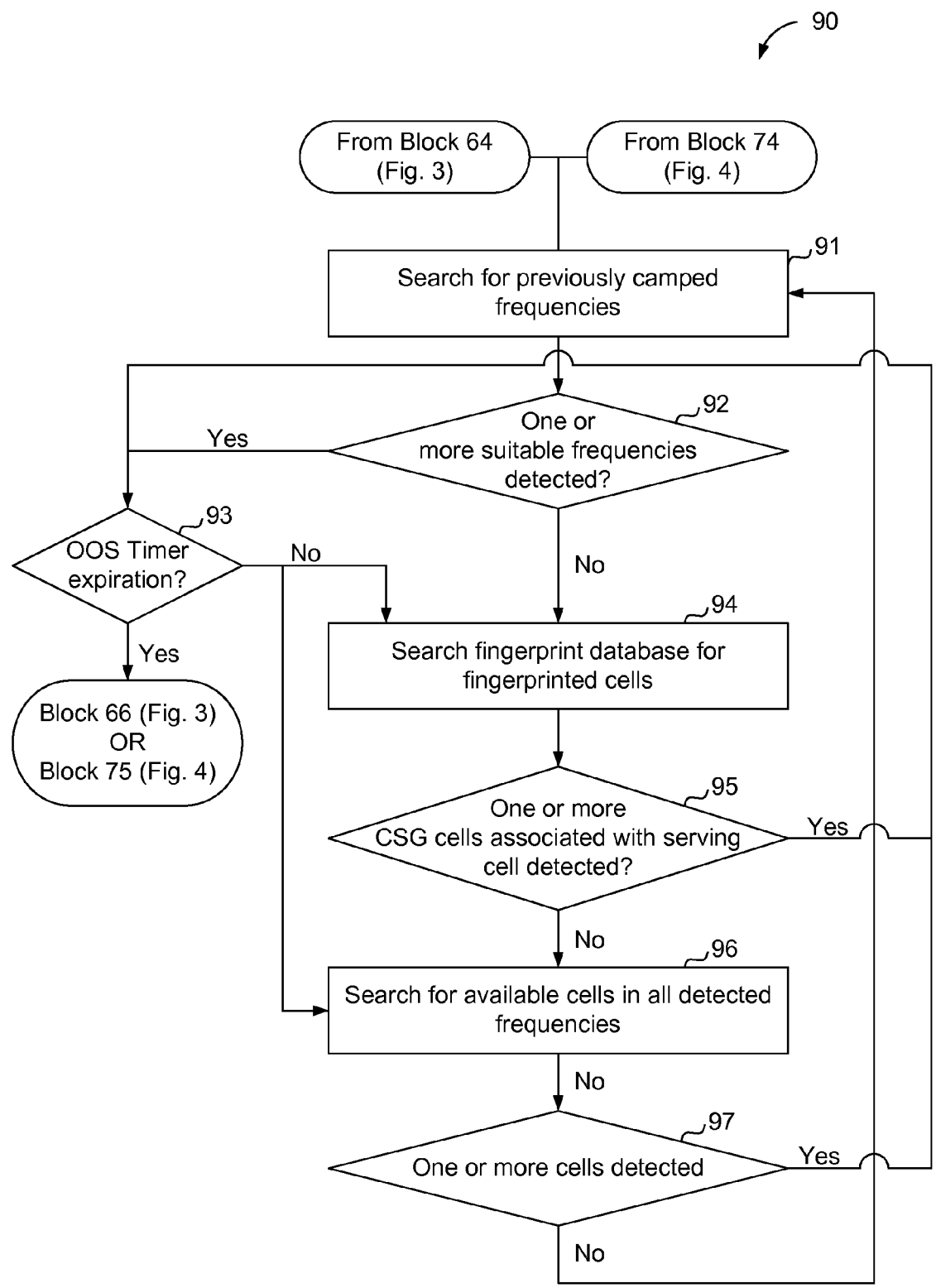
FIG. 5 is a flowchart of an aspect of the autonomous search procedures, e.g., according to FIG. 1.

Referring to FIG. 5, in operation, a UE such as UE 12 may perform an aspect of method 90, for performing one or more autonomous search procedures. At block 91, method 90 may search for previously camped frequencies and/or cells. For example, as described herein, search component 34 (FIG. 2) may execute first search procedure 36 to search a storage device on the UE 12 for previously camped frequencies across one or more cell frequency bands. At block 92, method 90 may include determining whether one or more suitable frequencies are detected. For example, as described herein, autonomous search procedure component 22 (FIG. 2) may execute search component 34 to determine whether one or more suitable frequencies are detected based on the first search procedure 36. If one or more suitable cells are detected based on the search at block 91, method 90 may continue to block 93, where a determination is made whether an out-of-service timer has expired. For instance, autonomous search procedure component 22 (FIG. 2) may execute out-of-service timer 52 to determine whether out-of-service timer has expired. If the out-of-service timer has expired, method 90 may proceed to block 66 (FIG. 3) or block 75 (FIG. 4).

However, if the out-of-service timer has not expired, method 90 may continue to block 94, where a search is made at a fingerprint database for fingerprinted cells. For instance, as described herein, search component 34 (FIG. 2) may execute second search procedure 38 to search for fingerprints corresponding to CSG cells associated with the serving cell. At block 95, method 90 includes determining whether one or more CSG cells associated with the serving cell are detected. For instance, as described herein, search component 34 (FIG. 2) may execute second search procedure 38 to determine whether one or more CSG cells associated with the serving cell are detected. If one or more suitable cells are detected based on the search at block 95, method 90 may continue to block 93, where a determination is made whether an out-of-service timer has expired. For instance, autonomous search procedure component 22 (FIG. 2) may execute out-of-service timer 52 to determine whether out-of-service timer has expired. If the out-of-service timer has expired, method 90 may proceed to block 66 (FIG. 3) or block 75 (FIG. 4).

However, if the out-of-service timer has not expired, method 90 may continue to block 96, where a search is made for available cells in all detected frequencies. Further, if one or more CSG cells associated with serving cells are not detected at block 95, method 90 may continue to block 96. For instance, as described herein, search component 34 (FIG. 2) may execute third component 40 to search for available cells in all detected frequencies. If one or more suitable cells are detected as determined at block 97, method 90 may continue to block 93, where a determination is made whether an out-of-service timer has expired. For instance, autonomous search procedure component 22 (FIG. 2) may execute out-of-service timer 52 to determine whether out-of-service timer has expired. However, if one or more cells are not detected at block 97, method 90 may return to block 91 and continues searching for suitable cells.

Figure 6:
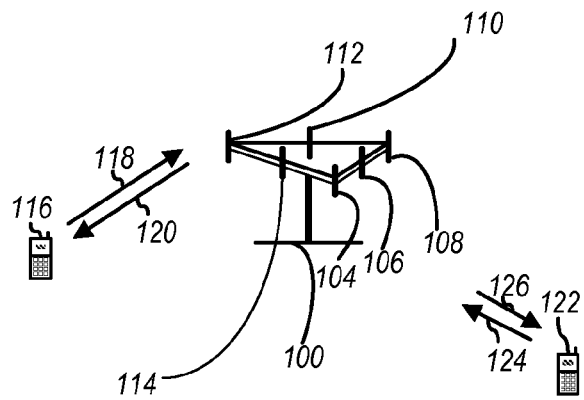
FIG. 6 illustrates a multiple access wireless communication system including an aspect of the network device described herein.

Referring to FIG. 6, a multiple access wireless communication system according to one aspect is illustrated. An access point 100 (AP) includes multiple antenna groups, one including 104 and 106, another including 108 and 110, and an additional including 112 and 114. Further, in some aspects, AP 100 may be the same or similar as serving cell 14, macro cell 18, and/or femto cell 20 (FIG. 1). In FIG. 6, only two antennas are shown for each antenna group, however, more or fewer antennas may be utilized for each antenna group. Access terminal 116 (AT), which may be the same as or similar to UE 12 (FIG. 1) including autonomous search procedure component 22, is in communication with antennas 112 and 114, where antennas 112 and 114 transmit information to access terminal 116 over forward link 120 and receive information from access terminal 116 over reverse link 118. Access terminal 122, which may be the same as or similar to UE 12 (FIG. 1) including autonomous search procedure component 22, is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the aspect, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, an evolved Node B (eNB), or some other terminology. An access terminal may also be called an access terminal, user equipment (UE), a wireless communication device, terminal, access terminal or some other terminology.

Figure 7:
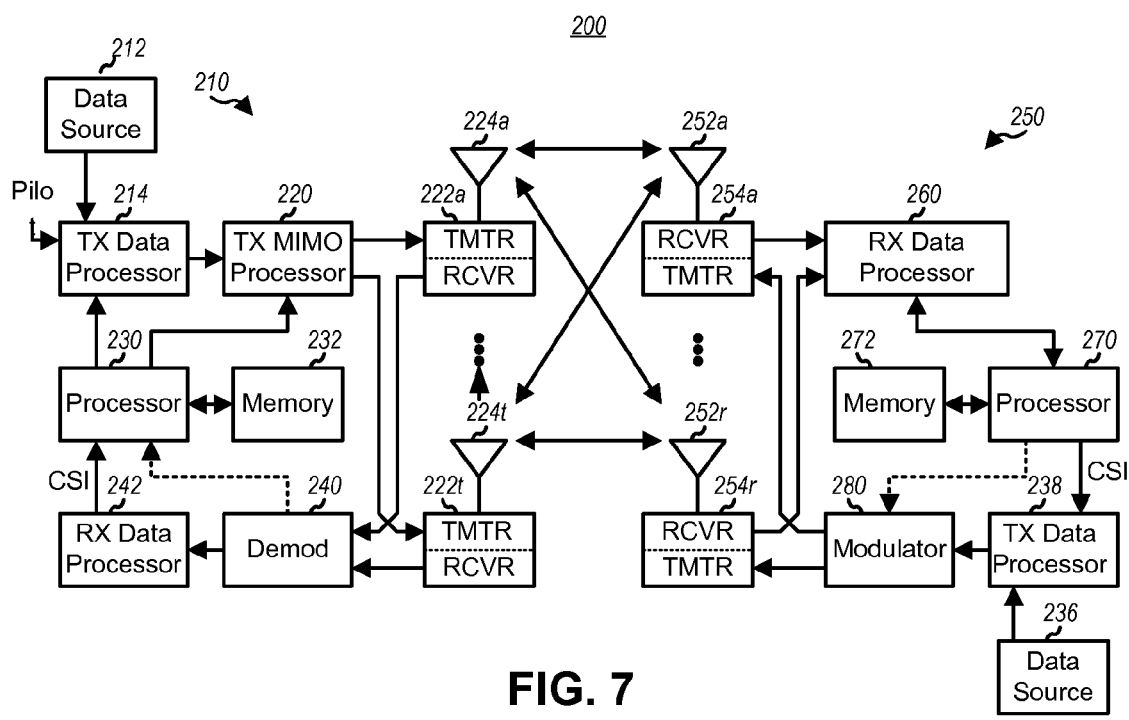
FIG. 7 illustrates a block diagram of a communication system including an aspect of the user equipment described herein.

FIG. 7 is a block diagram of an aspect of a transmitter system 210 (also known as the access point) and a receiver system 250 (also known as access terminal) in a Multiple-Input Multiple-Output (MIMO) system 200. In other aspects, transmitter system 210 may be the same as or similar to serving cell 14, macro cell 18 and/or femto cell 20 (FIG. 1). Further, in other aspects, receiver system 250 may be the same as or similar to UE 12 (FIG. 1). At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

Figure 8:
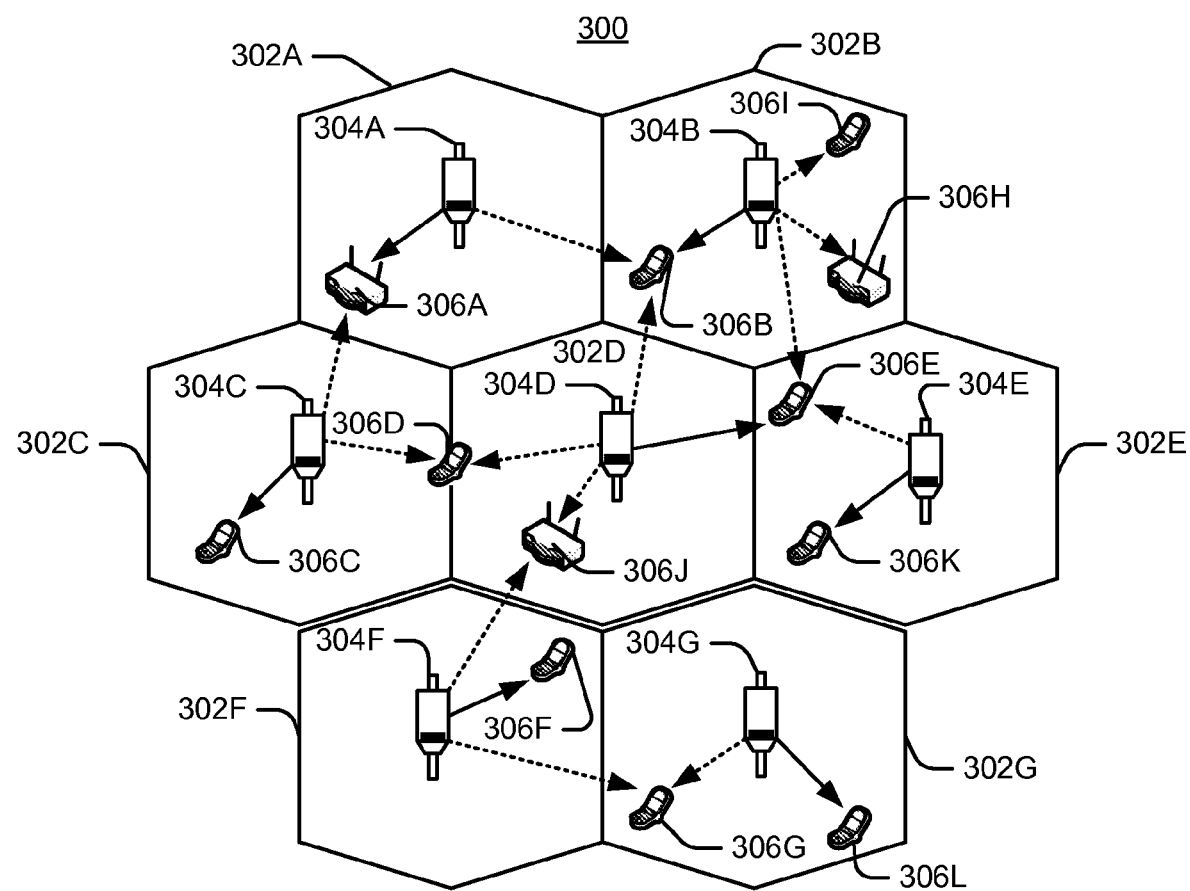
FIG. 8 illustrates a wireless communication system, configured to support a number of users, in which the aspects related to the user equipment described herein may be implemented.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCHMBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCHPhysical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel FIG. 8 illustrates a wireless communication system 300, configured to support a number of users, in which the teachings herein may be implemented. The system 300 provides communication for multiple cells 302, such as, for example, macro cells 302A-302G, with each cell being serviced by a corresponding access node 304 (e.g., access nodes 304A-304G). In some aspects, macro cells 302A-302G may be the same as or similar to serving cell 14, macro cell 18 and/or femto cell 20 (FIG. 1). As shown in FIG. 8, access terminals 306 (e.g., access terminals 306A-306L) may be dispersed at various locations throughout the system over time, wherein each access terminal 306 may be the same as or similar to UEs 12 (FIG. 1). Each access terminal 306 may communicate with one or more access nodes 304 on a forward link ("FL") and/or a reverse link ("RL") at a given moment, depending upon whether the access terminal 306 is active and whether it is in soft handoff, for example. The wireless communication system 300 may provide service over a large geographic region. For example, macro cells 302A-302G may cover a few blocks in a neighborhood.

Figure 9:
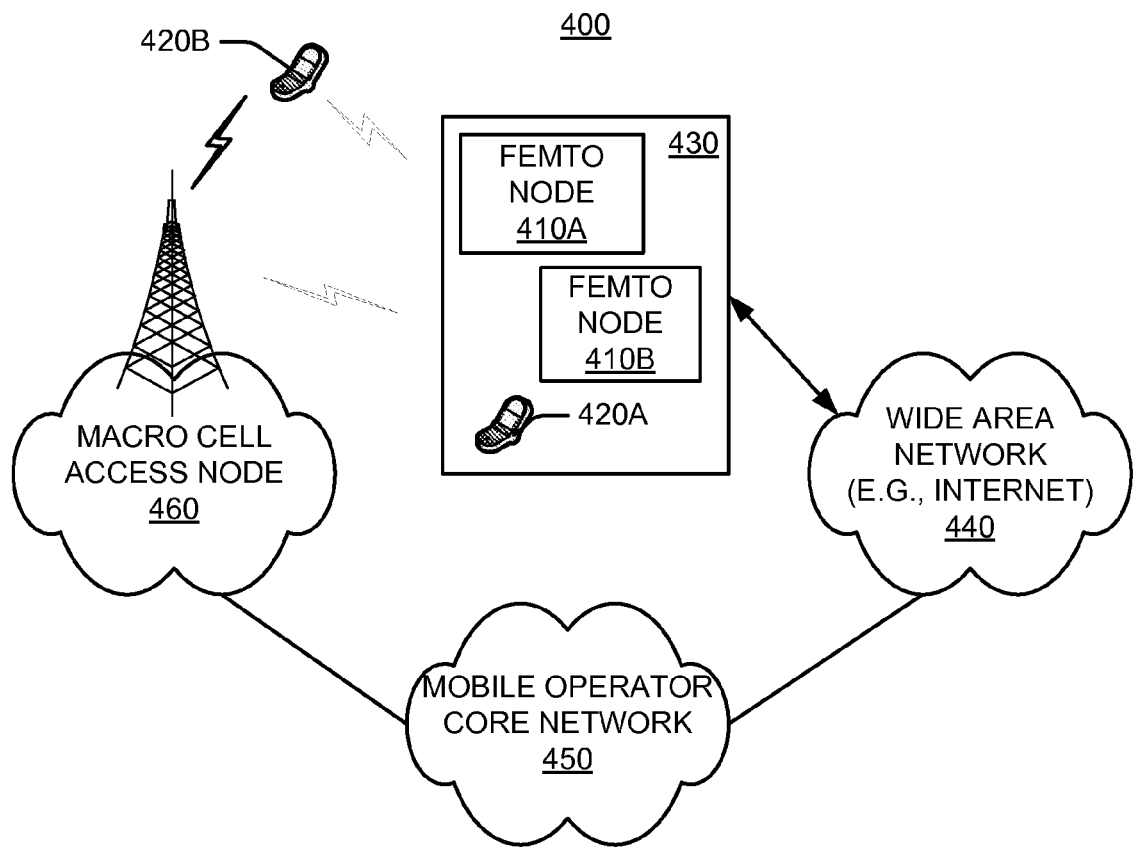
FIG. 9 illustrates an exemplary communication system to enable deployment of femto nodes within a network environment including an aspect of the user equipment described herein.

FIG. 9 illustrates an exemplary communication system 400 where one or more femto nodes are deployed within a network environment. Specifically, the system 400 includes multiple femto nodes 410 (e.g., femto nodes or HNB 410A and 410B) installed in a relatively small scale network environment (e.g., in one or more user residences 430), wherein the femto nodes 410 may be the same as or similar to serving cell 14, macro cell 18 and/or femto cell 20 (FIG. 1). Each femto node 410 may be coupled to a wide area network 440 (e.g., the Internet) and a mobile operator core network 450 via a DSL router, a cable modem, a wireless link, or other connectivity means (not shown). As will be discussed below, each femto node 410 may be configured to serve associated access terminals 420 (e.g., access terminal 420A) and, optionally, alien access terminals 420 (e.g., access terminal 420B), both of which may be the same as or similar to UE 12 (FIG. 1). In other words, access to femto nodes 410 may be restricted whereby a given access terminal 420 may be served by a set of designated (e.g., home) femto node(s) 410 but may not be served by any non-designated femto nodes 410 (e.g., a neighbor's femto node 410).

Figure 10:
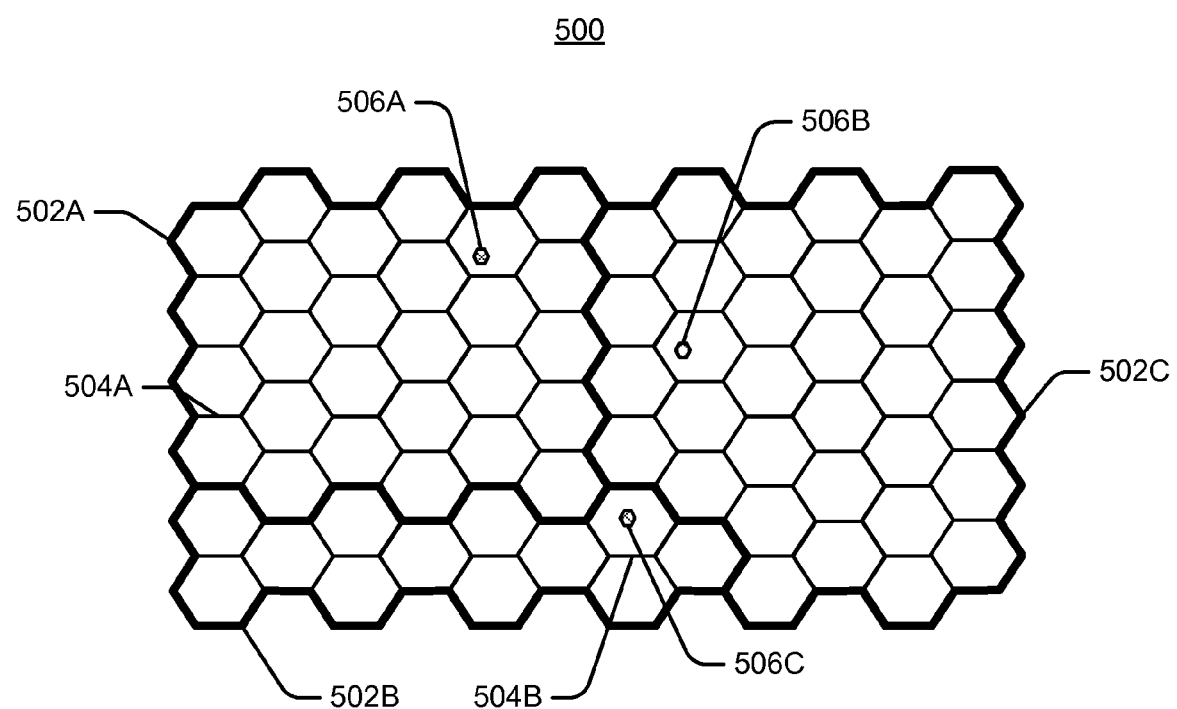
FIG. 10 illustrates an example of a coverage map where several tracking areas are defined, some of which may be provided by the user equipment described herein.

FIG. 10 illustrates an example of a coverage map 500 where several tracking areas 502 (or routing areas or location areas) are defined, each of which includes several macro coverage areas 504. Here, areas of coverage associated with tracking areas 502A, 502B, and 502C are delineated by the wide lines and the macro coverage areas 504 are represented by the hexagons. The tracking areas 502 also include femto coverage areas 506, which may be provided by one or more of serving cell 14, macro cell 18 and/or femto cell 20 (FIG. 1). In this example, each of the femto coverage areas 506 (e.g., femto coverage area 506C) is depicted within a macro coverage area 504 (e.g., macro coverage area 504B). It should be appreciated, however, that a femto coverage area 506 may not lie entirely within a macro coverage area 504. In practice, a large number of femto coverage areas 506 may be defined with a given tracking area 502 or macro coverage area 504. Also, one or more pico coverage areas (not shown) may be defined within a given tracking area 502 or macro coverage area 504.

Referring again to FIG. 9, the owner of a femto node 410 may subscribe to mobile service, such as, for example, 3G mobile service (e.g., UE 12 of FIG. 1), offered through the mobile operator core network 450. In addition, an access terminal 420 may be capable of operating both in macro environments and in smaller scale (e.g., residential) network environments. In other words, depending on the current location of the access terminal 420, the access terminal 420 may be served by an access node 460 of the macro cell mobile network 450 or by any one of a set of femto nodes 410 (e.g., the femto nodes 410A and 410B that reside within a corresponding user residence 430). For example, when a subscriber is outside his home, he is served by a standard macro access node (e.g., node 460) and when the subscriber is at home, he is served by a femto node (e.g., node 410A). Here, it should be appreciated that a femto node 420 may be backward compatible with existing access terminals 420.

A femto node 410 may be deployed on a single frequency or, in the alternative, on multiple frequencies. Depending on the particular configuration, the single frequency or one or more of the multiple frequencies may overlap with one or more frequencies used by a macro node (e.g., node 460). In some aspects, an access terminal 420 may be configured to connect to a preferred femto node (e.g., the home femto node of the access terminal 420) whenever such connectivity is possible. For example, whenever the access terminal 420 is within the user's residence 430, it may be desired that the access terminal 420 communicate only with the home femto node 410.

In some aspects, if the access terminal 420 operates within the macro cellular network 450 but is not residing on its most preferred network (e.g., as defined in a preferred roaming list), the access terminal 420 may continue to search for the most preferred network (e.g., the preferred femto node 410) using a Better System Reselection ("BSR"), which may involve a periodic scanning of available systems to determine whether better systems are currently available, and subsequent efforts to associate with such preferred systems. With the acquisition entry, the access terminal 420 may limit the search for specific band and channel. For example, the search for the most preferred system may be repeated periodically. Upon discovery of a preferred femto node 410, the access terminal 420 selects the femto node 410 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 410 that reside within the corresponding user residence 430). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method of cell detection, comprising:
    determining whether communication between a user equipment (UE) and a serving cell satisfies a serving cell unsuitability condition;
    performing one or more autonomous search procedures based on whether the serving cell unsuitability condition has been satisfied, wherein performing the one or more autonomous search procedures comprises at least one of:
        searching for previously camped frequencies; or
        searching a fingerprint database for fingerprinted cells; or
        searching for available cells in all detected frequencies; or
        any combination thereof;
    determining whether one or more results from the one or more autonomous search procedures indicate at least one suitable macro cell for reselection;
    determining whether a closed subscriber group (CSG) cell signal strength or frequency is greater than or equal to a macro cell signal strength or frequency corresponding to the at least one suitable macro cell in response to determining that the one or more results from the one or more autonomous search procedures indicate the at least one suitable macro cell for reselection; and
    conducting cell reselection based on one or more results from the one or more autonomous search procedures and based on the determination of whether the CSG cell signal strength or frequency is greater than or equal to the macro cell signal strength or frequency.

2. The method of claim 1, wherein searching for previously camped frequencies comprises searching a storage device on the UE for previously camped frequencies across one or more cell frequency bands.

3. The method of claim 1, wherein searching the fingerprint database for fingerprinted cells comprises searching for fingerprints corresponding to CSG cells associated with the serving cell.

4. The method of claim 1, wherein performing the one or more autonomous search procedures commences prior to an expiration of an out-of-service timer.

5. The method of claim 1, wherein the serving cell unsuitability condition comprises a serving cell disconnection threshold value, and wherein the determining comprises comparing the serving cell disconnection threshold value to a received serving cell signal characteristic.

6. The method of claim 1, wherein conducting cell reselection comprises reselecting to a CSG cell in response to determining that the one or more results from the one or more autonomous search procedures do not indicate the at least one suitable macro cell for reselection.

7. The method of claim 6, wherein reselecting to the CSG cell occurs based on the determination that the CSG cell signal strength or frequency is greater than or equal to the macro cell signal strength or frequency.

8. The method of claim 1, further comprising ranking each of the at least one suitable cell for reselection based on the determination that the CSG cell signal strength or frequency is not greater than or equal to the macro cell signal strength or frequency.

9. The method of claim 8, wherein the ranking is based at least on one of a received energy-to-interference ratio and received signal code power.

10. An apparatus for cell detection, comprising:
    means for determining whether communication between a user equipment (UE) and a serving cell satisfies a serving cell unsuitability condition;
    means for performing one or more autonomous search procedures based on whether the serving cell unsuitability condition has been satisfied, wherein the means for performing the one or more autonomous search procedures comprises at least one of:
  means for searching for previously camped frequencies; or
  means for searching a fingerprint database for fingerprinted cells; or
  means for searching for available cells in all detected frequencies; or
  any combination thereof;
means for determining whether one or more results from the one or more autonomous search procedures indicate at least one suitable macro cell for reselection;
means for determining whether a closed subscriber group (CSG) cell signal strength or frequency is greater than or equal to a macro cell signal strength or frequency corresponding to the at least one suitable macro cell in response to determining that the one or more results from the one or more autonomous search procedures indicate the at least one suitable macro cell for reselection; and
means for conducting cell reselection based on one or more results from the one or more autonomous search procedures and based on the determination of whether the CSG cell signal strength or frequency is greater than or equal to the macro cell signal strength or frequency.

11. The apparatus of claim 10, wherein the means for searching for previously camped frequencies comprises means for searching a storage device on the UE for previously camped frequencies across one or more cell frequency bands.

12. The apparatus of claim 10, wherein the means for searching the fingerprint database for fingerprinted cells comprises means for searching for fingerprints corresponding to CSG cells associated with the serving cell.

13. The apparatus of claim 10, wherein performing the one or more autonomous search procedures commence prior to an expiration of an out-of-service timer.

14. A non-transitory computer-readable medium storing computer-executable code for cell detection, comprising:
  code for determining whether communication between a user equipment (UE) and a serving cell satisfies a serving cell unsuitability condition;
  code for performing one or more autonomous search procedures based on whether the serving cell unsuitability condition has been satisfied, wherein the code for performing the one or more autonomous search procedures comprises at least one of:
    code for searching for previously camped frequencies; or
    code for searching a fingerprint database for fingerprinted cells; or
    code for searching for available cells in all detected frequencies; or
    any combination thereof;
  code for determining whether one or more results from the one or more autonomous search procedures indicate at least one suitable macro cell for reselection;
  code for determining whether a closed subscriber group (CSG) cell signal strength or frequency is greater than or equal to a macro cell signal strength or frequency corresponding to the at least one suitable macro cell in response to determining that the one or more results from the one or more autonomous search procedures indicate the at least one suitable macro cell for reselection; and
  code for conducting cell reselection based on one or more results from the one or more autonomous search procedures and based on the determination of whether the CSG cell signal strength or frequency is greater than or equal to the macro cell signal strength or frequency.

15. The non-transitory computer-readable medium of claim 14, wherein the code for searching for previously camped frequencies comprises code for searching a storage device in the UE for previously camped frequencies across one or more cell frequency bands.

16. The non-transitory computer-readable medium of claim 14, wherein the code for searching the fingerprint database for fingerprints corresponding to fingerprinted cells comprises code for searching for CSG cells associated with the serving cell.

17. The non-transitory computer-readable medium of claim 14, wherein performing the one or more autonomous search procedures commence prior to an expiration of an out-of-service timer.

18. An apparatus for cell detection, comprising:
  a serving cell unsuitability determiner configured to determine whether communication between a user equipment (UE) and a serving cell satisfies a serving cell unsuitability condition;
  an autonomous search procedure component configured to perform one or more autonomous search procedures based on whether the serving cell unsuitability condition has been satisfied, wherein the autonomous search procedure component is configured to perform the one or more autonomous search procedures by at least one of:
    searching for previously camped frequencies; or
    searching a fingerprint database for fingerprinted cells; or
    searching for available cells in all detected frequencies; or
    any combination thereof;
  wherein the autonomous search procedure component is further configured to determine whether one or more results from the one or more autonomous search procedures indicate at least one suitable macro cell for reselection;
  a comparator configured to determine whether a closed subscriber group (CSG) cell signal strength or frequency is greater than or equal to a macro cell signal strength or frequency corresponding to the at least one suitable macro cell in response to determining that the one or more results from the one or more autonomous search procedures indicate the at least one suitable macro cell for reselection; and
  a reselection component configured to conduct cell reselection based on one or more results from the one or more autonomous search procedures and based on the determination of whether the CSG cell signal strength or frequency is greater than or equal to the macro cell signal strength or frequency.

19. The apparatus of claim 18, wherein to search for previously camped frequencies, the search component is further configured to search a storage device on the UE for previously camped frequencies across one or more cell frequency bands.

20. The apparatus of claim 18, wherein to search the fingerprint database for fingerprinted cells, the search component is further configured to search for CSG cells associated with the serving cell.

21. The apparatus of claim 18, wherein the autonomous search procedure component is configured to commence performance of the one or more autonomous search procedures prior to an expiration of an out-of-service timer.

22. The apparatus of claim 18, wherein the serving cell unsuitability condition comprises a serving cell disconnection threshold value, and wherein the autonomous search procedure component is further configured to compare the serving cell disconnection threshold value to a serving cell signal characteristic.

23. The apparatus of claim 18, wherein the search results analyzer is further configured to reselect to a CSG cell in response to determining that the one or more results from the one or more autonomous search procedures do not indicate the at least one suitable macro cell for reselection.

24. The apparatus of claim 23, the search results analyzer is further configured to reselect to the CSG cell based on the determination that the CSG cell signal strength or frequency is greater than or equal to the macro cell signal strength or frequency.

25. The apparatus of claim 18, further comprising a ranking component configured to rank each of the at least one suitable cell for reselection based on the determination that the CSG cell signal strength or frequency is not greater than or equal to the macro cell signal strength or frequency.

26. The apparatus of claim 25, wherein the ranking is based at least on one of a received energy-to-interference ratio and received signal code power.

27. The method of claim 1, further comprising:
   determining whether at least one suitable macro cell is detected in response to performing the one or more autonomous search procedures; and
   wherein conducting cell reselection includes conducting cell reselection based the determination that the at least one suitable macro cell is detected.

28. The apparatus of claim 18, further comprising:
   a search results analyzer configured to determine whether at least one suitable macro cell is detected in response to performing the one or more autonomous search procedures; and
   wherein the reselection component is further configured to conduct cell reselection based on the determination that the at least one suitable macro cell is detected.

* * * * *